O. O. Storle,
Horse Rake.
No. 113,813.    Patented Apr. 18, 1871.
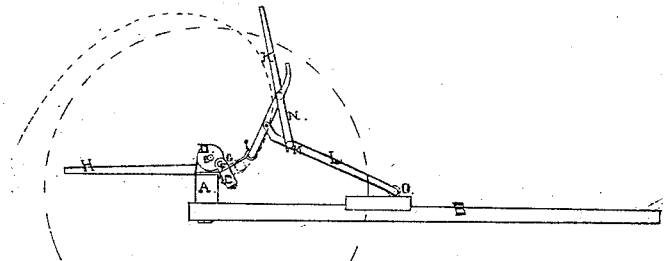
FIG. I.
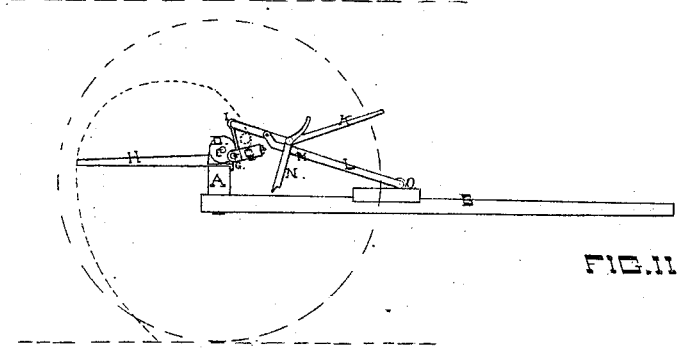
FIG. II.
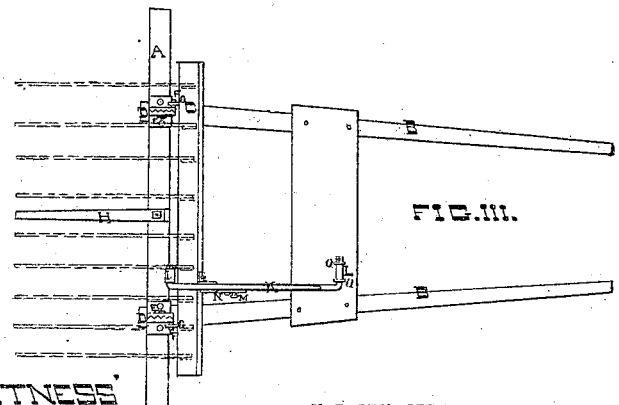
FIG. III.
WITNESS
J. B. Smith
W. M. Hornor.
INVENTOR
Ole O. Storle

United States Patent Office.

OLE O. STORLE, OF NORTH CAPE, WISCONSIN.

Letters Patent No. 113,813, dated April 18, 1871; antedated April 1, 1871.

IMPROVEMENT IN HORSE HAY-RAKES.

The Schedule referred to in these Letters Patent and making part of the same.

I, OLE O. STORLE, of North Cape, in the county of Racine, in the State of Wisconsin, have invented certain Improvements in Horse Hay-Rakes, of which the following is a specification.

Nature and Object of the Invention.

My invention relates to the locking and unlocking the rake, and fastening and adjusting the rake-head, and fastening the teeth-cleaners to the axle-tree of the rake.

Description of the Drawing forming part of this Specification.

Figure I is a side view of my invention, with the rake locked up;

Figure II, side view, with the rake-teeth down; and

Figure III, a top view.

General Description.

A is the axle-tree.

B, the shafts.

C, the rake-head.

D D, corrugated ears by which the rake-head is fastened to the axle-tree.

E E, bolts which fasten the ears D together.

F, crank-pin on one part of the ear.

G, iron on the rake-head which connects the rake-head to the ears.

H, teeth-cleaners fastened on the top of axle-tree.

I, iron on the rake-head to which the lock is fastened.

K, lever with which the rake is raised and lowered.

L, iron pivoted to lever K at one end, and the other fastened to the cross-bar of the shafts.

M, stop-piece on iron L.

N, swinging latch or stop, its center pivoted to lever K, with a half-round slot in its lower end to rest on stop M when the rake is raised.

The iron I, lever K, iron L, stop M, and latch N form a holding device to hold up the rake, and to raise and lower the rake when raking.

O O, ears on the cross-bar of the shafts to hold the end of iron L, and on which it moves.

Whenever it is necessary to change the rake to make the teeth press harder or lighter on the ground, loosen nuts or bolts E and move one-half of the ear around into another corrugation, and then set up the nut, and the work is done; and, when the rake is moved without raking, raise up lever K and bring latch N over stop M, and let the lower end of latch N rest on stop M, and the teeth of the rake will be elevated.

Claim.

The arrangement of iron I, lever K, iron L, stop M, and latch N with eye-bolts O, forming a locking device, substantially as described.

OLE O. STORLE.

Witnesses:
 J. B. SMITH,
 W. M. HORNOR.